Jan. 13, 1931.  C. L. JOHNSON  1,788,396
CHAIN LOCK
Filed April 9, 1928
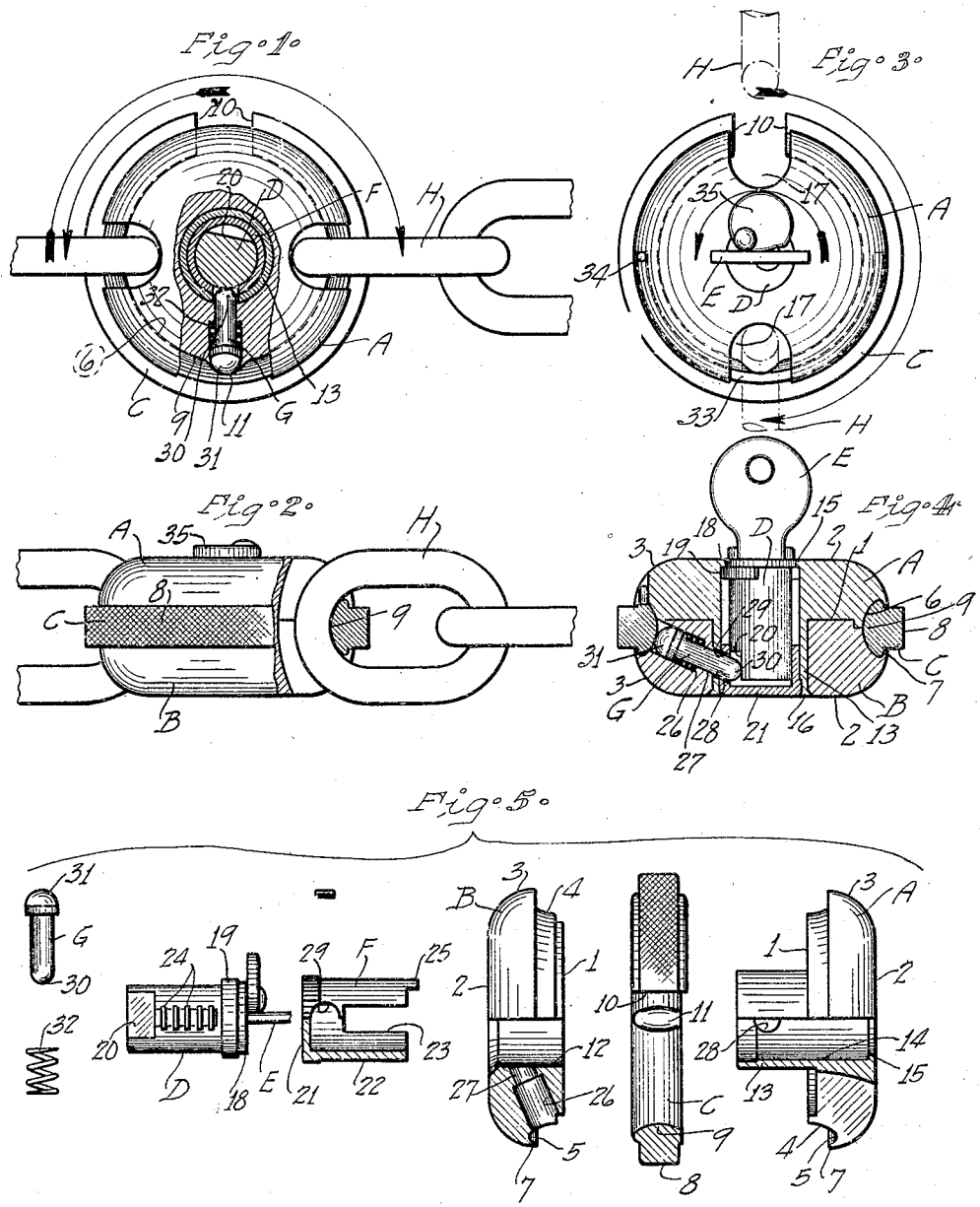
INVENTOR
Colvin L. Johnson.
BY
ATTORNEY Patented Jan. 13, 1931

1,788,396

UNITED STATES PATENT OFFICE

COLVIN L. JOHNSON, OF ST. LOUIS, MISSOURI, ASSIGNOR, BY MESNE ASSIGNMENTS, TO FRANK C. WEBB, OF ST. LOUIS, MISSOURI

CHAIN LOCK

Application filed April 9, 1928. Serial No. 268,623.

This invention relates generally to locks and, more particularly, to a certain new and useful improvement in locks especially adapted for fastening together the ends of a chain or the like.

My invention has for its objects the provision of a lock of the class and for the purpose stated which may be readily manufactured, which is compact and durable in structure, which is conveniently operable, and which is efficient and satisfactory in use wherever found applicable.

And with the above and other objects in view, my invention resides in the novel features of form, construction, arrangement, and combination of parts hereinafter described and pointed out in the claims.

In the accompanying drawing,—

Figure 1 is a plan view, partly broken away and in section, of a lock embodying my invention, shown in operative locking engagement with the opposed ends of a chain;

Figure 2 is an elevational view, also partly broken away and in section, of the lock;

Figure 3 is a plan view of the lock, showing the lock in manipulation during the engagement of a chain therewith;

Figure 4 is a transverse sectional view of the lock; and

Figure 5 shows in elevation and in assembling relation the several parts of the lock.

Referring now more in detail and by reference characters to the drawing, which illustrates a preferred embodiment of my invention, the body of the lock is constructed of a pair of companion members A, B, preferably circular in contour, each of which members has a flat inner face, as at 1, for flatwise abutting relation the one with the other, and each of which is preferably generally flat upon its outer face, as at 2, with the outer peripheral corners thereof rounded or arcuate, as at 3.

Circumferentially, at and adjacent their inner face, each of the members A, B, is similarly cut-away or recessed, as at 4, and peripherally under-cut, as at 5, for providing an annular way, as at 6, and an annular retaining flange 7 for a locking-ring C preferably knurled or otherwise roughened upon its outer periphery, as at 8, and which ring has an inner peripheral portion 9 enlarged and correspondingly contoured and shouldered to fit for rotatory movement in the way 6 and for retaining engagement by the flange 7. The ring C is of rigid split type, with its opposed ends 10, 10, suitably spaced one from the other, as best seen in Figure 3, and diametrically opposite said end-spacing is provided upon its inner periphery with a recess 11.

The member B has an axial bore, as at 12, and projecting axially from the inner face of member A to fit and reside in the bore 12 of member B, is a cylindrical extension 13, the member A and its extension 13 having a continuous bore, as at 14, whose opposite ends open, when the members A and B are in assembled abutting relation, upon the outer opposed faces 2 of the members A and B, as best seen in Figure 4. It will be noted, however, that the member A is counterbored to provide an annular shoulder, as at 15, at one end of bore 14, for purposes shortly appearing, the cylindrical extension 13 being clinched or upset at its outer end, as at 16, upon the member B, whereby the members A and B are rigidly and permanently secured together with their said inner faces 1 in tight flatwise abutting relation, and whereby also, through the retaining engagement of the annular flanges 7 with the shouldered portion 9 of ring C, the ring C is permanently retained for bodily rotatory movement in the circumferential groove or way 6 provided, as described, in and by the opposed surface-recesses 4—5 of the members A and B. For purposes also soon to appear, the conjoined or united members A and B are peripherally notched or recessed at preferably diametrically opposite points, as at 17, 17, which notches interrupt the way 6 and are preferably of arcuate contour at their base, as shown, and the mouth of each of which has a width circumferentially of the members A, B, approximately equal to the spacing of the ring-ends 10.

Disposed for rotatory movement in the bore 14, is a lock-barrel or cylinder D of any standard type adapted for rotatory actuation by means of a special or particular insertable key E. Cylinder D is of somewhat reduced diameter relatively to the diameter of the body-bore 14, and, as best seen in Figure 4, the outer or key-opening end of cylinder D is presented to and approximately flush with the outer end face 2 of the lock body-member A, the cylinder D at its said end having an annular collar 18 snugly fitting for rotatory movement in the confines of the body-shoulder 15. Fixed on the cylinder D preferably immediately adjacent collar 18, is an arcuate lug 19 adapted to abut against the body-shoulder 15 to permanently retain the barrel or cylinder D against endwise removal through the end face 2 of member A. For purposes presently appearing, the lug 19 extends merely chordwise relatively to the cylinder D, and adjacent its inner end, the cylinder D is cut-away and thereby provided with a surface cam-recess, as at 20.

Driven or otherwise fixed to reside permanently in bore 14 with the outer face of its end-wall 21 approximately flush with the outer face 2 of the lock body-member B and with its side wall 22 embracing the lock-cylinder D, is a cup-shaped member F. At diametrically opposite points, the side wall 22 of member F is slotted, as at 23, 23, to accommodate and for co-operation with the key-actuable tumblers or devices 24 of the cylinder D, and at its rim has a projection or finger 25 fitting intermediate the ends of the chord-lug 19 and providing, by engagement with the ends of lug 19, a stop for limiting the rotary locking and unlocking oscillations of the cylinder D. I may add here that the member F permanently retains the lock-cylinder D from endwise removal through the end-face 2 of the body-member B.

Formed in the lock body-member B and opening at its outer end into the way or groove 6, is an obliquely disposed recess 26 which communicates at its lower end with a series of preferably diametrically reduced and registering openings 27, 28, and 29 formed, respectively, in the body-member B, the extension 13 of body-member A, and the side wall 22 of the cup-member F. Disposed obliquely for endwise shiftable movement in the recess 26 and said communicating and registering openings 27, 28 and 29 is a pin G preferably cam-wise rounded at its rear end, as at 30, and having at its other end a preferably enlarged head 31 contoured, as shown, for releasable engagement with the ring C at its peripheral recess 11. Coiled on the pin G and abutting at its ends against the pin-head 31 and the end wall of the recess 26, is a spring 32 adapted to yieldingly maintain the pin G in engagement at its head 31 with the ring C. Formed in a portion of the body-members A, B, at the base of the way 6, is a counter-groove 33, adapted to work in which is a projection 34 formed on the ring C for limiting the rotary reciprocations of the ring C, the groove 33 and projection 34 being so relatively located that the ring C will throughout its said rotary reciprocations reside over, conceal, and prevent outward endwise removal of the locking pin G.

The parts of the lock being constructed and assembled as described, in use and operation, on the cylinder D being key-actuated to dispose its recess 20 in alignment with the opening 29 in the cup F, the pin G is free to yieldingly move or shift inwardly, when the ring C may be freely rotarily moved first in one direction and then in the other, as indicated by the arrows in Figure 1, to dispose its spaced ends 10 successively in radial alignment with the walls of the peripheral body notches 17 for successive disposition therein of the respective end-links or other end-members of a chain H or the like. The chain ends being so disposed, and the ring rotarily shifted to locking position, in which position the ring C, while engaging the chain-ends, is disposed across or over and provides a closure for said notches 17, the cylinder D is reversely key-actuated, when the pin G will be camwise shifted outwardly to seat and engage at its head 31 in and with the notch 11 of ring C and ring C thereby locked against rotary movement with the chain links held thereby in the body notches 17, the ring C being so retained against rotary movement so long as the cylinder D is in normal locked condition with its cam-recess 20 out of registration with the opening 29 in the member F, and it may be here stated that the cylinder D is so constructed that the key E may not be withdrawn until the cylinder D is in normal locked condition, which adds an element of safety to my new lock. As is usual, a pivoted-piece 35 is provided on the barrel or cylinder D to normally protect the cylinder key-opening against the entrance of dust, dirt, and the like.

I am aware that changes in the form, construction, arrangement, and combination of the several parts of my new lock may be made and substituted for those herein shown and described without departing from the nature and principle of my invention.

Having thus described my invention, what I claim and desire to secure by Letters Patent is:

1. In a lock, in combination, a circumferentially grooved and peripherally notched body-member, a split rigid ring mounted in said groove and encircling the body-member for rotatory closure movement across the mouth of the notch, the ring being provided intermediate its ends with a body-recess, and means for releasably locking the ring in notch-closing position, said means including a pin endwise shiftable in the body-member and engageable with the ring at said recess.

2. In a lock, in combination, a circumferentially grooved and peripherally notched body-member, a split rigid ring mounted in said groove and encircling the body-member for rotatory closure movement across the mouth of the notch, the ring being provided intermediate its ends with a body-recess, and key-actuable means including a pin endwise shiftable in the body-member and engageable with the ring at said recess for releasably locking the ring in notch-closing position.

3. In a lock, in combination, a peripherally notched body-member, a split rigid ring mounted on the body-member for rotatory closure movement across the mouth of the notch, the ring being provided intermediate its ends with a body-recess, and key-actuable means upon the body-member for releasably locking the ring in notch-closing position, said means including a pin mounted for endwise movement in the body-member and engageable with the ring at said recess, and a rotary cylinder normally retaining the pin in engagement with the ring.

4. In a lock, in combination, a peripherally notched body-member, a split rigid ring mounted on the body-member for rotatory closure movement across the mouth of the notch, the ring being provided intermediate its end with a body-recess, and key-actuable means upon the body-member for releasably locking the ring in notch-closing position, said means including a spring-pressed pin normally yieldingly engaging the ring at said recess, and a rotary cylinder normally retaining the pin in engagement with the ring.

5. In a lock, in combination, a peripherally notched body-member, a split rigid ring mounted on the body-member for rotatory closure movement across the mouth of the notch, a spring-pressed pin mounted in the body-member for normally yieldingly engaging the ring, and a key-actuable cylinder mounted for rotary movement in the body-member for normally retaining the pin in engagement with the ring, the cylinder having a surface recess adapted, when in registration with the pin, to permit depression of the pin by, and out of locking engagement with, the ring.

6. In a lock, in combination, a peripherally notched and circumferentially grooved body-member, a split rigid ring retained in said groove for rotatory closure movement across the mouth of the notch, the ring having a recess on its inner periphery, a spring-pressed pin mounted in the body-member for normally yieldingly engaging at an end with the ring at said recess, and a key-actuable cylinder mounted for rotatory movement in the body-member and normally engaging the pin at its other end for locking the same in engagement with the ring, the cylinder having a surface recess adapted, when in registration with the pin, to permit depression of the pin by, and out of locking engagement with, the ring.

7. In a lock, in combination, a body-member circular in contour having a circumferential surface groove, there being a peripheral notch in the body member interrupting said groove, a split rigid ring encircling the body-member and retained in said groove for rotary closure movement across the mouth of the notch, the ends of the ring being adapted for registration with the walls of the notch to permit placement into the notch of the apertured end of a chain, the ring being provided intermediate its ends with a body recess, and key actuable means including an endwise shiftable pin engageable with the ring at said recess for locking the ring against rotary movement and in notch closure position.

8. In a lock, in combination, a body-member having a circumferential groove, there being diametrically opposed peripheral notches in the body-member interrupting said groove, a split rigid ring retained in said groove for rotary movement across the mouths of said notches, the ring being adapted for successive registration with said notches to permit the successive disposition therein of the ends of a chain, and key-actuable means in the body-member for locking the ring against rotation and in notch closure position.

9. In a lock, in combination, a body-member having a circumferential groove, there being diametrically opposed peripheral notches in the body member interrupting said groove, a split rigid ring retained in said groove for rotary movement across the mouths of said notches, the ring being adapted for successive registration with said notches to permit the successive disposition therein of the ends of a chain, and key-actuable means in the body member for locking the ring against rotation and in notch closure position, said means comprising a spring-pressed pin yieldingly engaging the ring, and a cylinder normally holding the pin against movement and in engagement with the ring.

10. In a lock, a pair of companion members disposed flatwise in abutting registering relation, one of said members having an axial bore, an integral tubular extension upon the other of said members, said extension projecting into and through said bore and being upset at its outer end upon the bored member for permanently securing said members co-operatively together, and a lock-cylinder permanently secured to said members to reside within said extension.

11. In a lock, in combination, a circumferentially grooved and peripherally notched annular body-member, a split rigid ring mounted in said groove and encircling the body-member for rotatory closure movement across the mouth of the notch, and means for releasably locking the ring to the body-member in notch-closing position.

In testimony whereof, I have signed my name to this specification.

COLVIN L. JOHNSON.